United States Patent [19]
Al Ghatta et al.

[11] Patent Number: 5,708,124
[45] Date of Patent: Jan. 13, 1998

[54] PROCESS FOR THE SOLID STATE POLYCONDENSATION OF POLYESTER RESINS

[75] Inventors: Hussain Ali Kashif Al Ghatta, Fiuggi; Dario Giordano, Tortona, both of Italy

[73] Assignee: Sinco Engineering S.p.A., Italy

[21] Appl. No.: 568,636

[22] Filed: Dec. 7, 1995

[30] Foreign Application Priority Data

Dec. 16, 1994 [IT] Italy .................... MI94A2544

[51] Int. Cl.⁶ .................................. C08F 20/00
[52] U.S. Cl. ................ 528/308.3; 528/272; 528/302; 528/308.2; 528/308.6; 528/481; 528/492; 528/503
[58] Field of Search ................. 528/272, 302, 528/308.2, 308.6, 481, 492, 503, 308.3

[56] References Cited

U.S. PATENT DOCUMENTS

| | | |
|---|---|---|
| 4,064,112 | 12/1977 | Rothe et al. . |
| 4,161,578 | 7/1979 | Herron . |
| 4,226,973 | 10/1980 | Malo et al. . |
| 4,532,319 | 7/1985 | Wendling et al. . |
| 4,691,562 | 9/1987 | Abthoff et al. ............... 73/118.1 |
| 4,733,358 | 3/1988 | Abthoff et al. ............... 364/431 |
| 5,119,570 | 6/1992 | Russemeyer et al. . |
| 5,243,020 | 9/1993 | Ghisolfi . |
| 5,334,669 | 8/1994 | Ghisolfi . |
| 5,338,808 | 8/1994 | Ghisolfi . |

FOREIGN PATENT DOCUMENTS

| | | |
|---|---|---|
| 0 197 717 | 10/1986 | European Pat. Off. . |
| 0 222 714 | 5/1987 | European Pat. Off. . |
| 0 222 714 A2 | 9/1988 | European Pat. Off. . |
| 0 222 714 A3 | 9/1988 | European Pat. Off. . |
| 422 282 | 4/1991 | European Pat. Off. . |
| 3424532C1 | 1/1986 | Germany . |
| 3527175A1 | 2/1987 | Germany . |
| 3628572A1 | 3/1988 | Germany . |
| WO95/02446 | 1/1995 | WIPO . |

OTHER PUBLICATIONS

Abstract: WPI/Derwent, Section Ch, Week 8711, Derwent Publications Ltd., London, GB; Class E36, AN 87–073107 & DD,A,240 672 (VEB Leuna–Werk Ulbricht), Nov. 12, 1986.

Derwent abstract of DE 3 628 572 in English, Mar. 1988.

*Primary Examiner*—Samuel A. Acquah
*Attorney, Agent, or Firm*—Edward D. Manzo; Mark J. Murphy; Ted K. Ringsred

[57] ABSTRACT

Process for the solid state polycondensation of polyester resins, where an inert gas is circulating in a moving bed of polymer at a temperature between 180° and 230° C., characterized by the fact that the ratio by weight between the gas rate of flow per hour and that one of the discharged polymer is lower than 0.6.

19 Claims, No Drawings

PROCESS FOR THE SOLID STATE POLYCONDENSATION OF POLYESTER RESINS

BACKGROUND OF THE INVENTION

The present invention relates to a process for the solid state polycondensation of polyester resins.

The aromatic polyester resins, particularly the polyethyleneterephthalate (PET), the copolymers of the terephthalic acid with minor proportions of isophthalic acid and polybuthyleneterephthalate, find wide application both in the fibres and the films area, or as molding material.

While for fibres and films the intrinsic viscosity of the resin is in general between 0.6–0.75 dl/g, the molding material has necessarily higher values, which with difficulty are directly obtainable by the polycondensation process of the resin.

The intrinsic viscosity is increased to the required values (in general higher than 0.75 dl/g) by means of SSP processes of the resin, at a temperature in general between 190° and 2300° C.

Since the starting resin used for the SSP process is in the amorphous state, it is necessary to take it to a sufficient degree of crystallinity before it is submitted to the SSP process.

The crystallization is necessary in order to avoid polymer chips stocking in the polycondensation reactor that is in general formed by a vertical moving bed where the polymer filled from the top is passed through by an inert gas stream which removes the volatile residual products of the polycondensation reaction (ethylene glycol and acetaldehyde in the case of polyethyleneterephthalate).

The removal of the products of the polycondensation reaction is a fundamental requisite for the development of the same reaction.

Various reactions occur during the polycondensation. The main reaction, that leads to the increase of the PET molecular weight, is the removal of ethylene glycol:

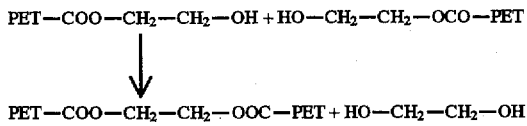

Other reactions lead to the esterifications of carboxylic end-groups and to the formation of acetaldehyde.

The polycondensation and esterification reactions are reversible while the reactions leading to the acetaldehyde formation are irreversible and of various types.

These include the degradation reaction of the polymeric chain with the formation of a vinylester end-group, which reacts with an OH end-group to eliminate acetaldehyde; the reaction of the vinylester group with a COOH end group with formation of an anhydride group and acetaldehyde removal; and the degradation reaction of hydroxyethylic end groups with acetaldehyde formation.

The acetaldehyde removal from the polymer at levels lower than a few ppm is a fundamental requisite of PET for the production of items for food uses, such as mineral water bottles.

As indicated supra, the residual products of the polycondensation reaction are eliminated by passing an inert gas stream equi- or countercurrently with the feeding of polymer coming from the crystallisation stage.

The polycondensation reaction is in general carried out in a tubular reactor with a moving bed. The polymer enters from the top of the reactor and comes out the bottom. An inert gas stream is passed over the polymer.

In U.S. Pat. No. 4,064,112, a process of this type, is described. The granular polymer is crystallized up to a degree of density of at least 1.390 g/cm³, by operating in crystallizers with forced movement at a temperature between 220° and 260° C. Then the polycondensation reaction in a reactor with a moving bed occurs at temperatures equal or lower than those used in the crystallization step. The temperature in the crystallization step is in general between 230° and 245° C. The process is carried out until crystallinity values corresponding to 1.403–1.415 g/cm³ density are obtained. A temperature between 230° and 245° C. is used in the polycondensation step to obtain an optimal value of reaction speed combined with a low degree of polymer degradation. An inert gas, preferably nitrogen, is used to remove the residual products formed in the polycondensation stage. The gas is recycled after by-products purification.

The polymer undergoes hydrolysis decompositions when the water content exceeds that one above indicated.

The reaction speed is influenced negatively, when the glycol content exceeds the above indicated one.

A high content of oxygen and acetaldehyde can cause discoloring in the shaped article. A high content of acetaldehyde is not allowed in the shaped articles for food use.

To limit purification costs of the gas recycling and energy costs for the maintenance of the gaseous flow, the ratio by weight between the gas rate of flow per hour and the rate of flow per hour of the polymer leaving the reactor has to be maintained between 0.7:1 and 3:1, preferably between 1:1 and 2:1.

If values lower than 0.7 (0.5 and 0.3 in the examples) and the conditions set forth in U.S. Pat. No. 4,064,112 (crystallization temperature 2350° C. and polycondensation temperature 2300° C.) are used the intrinsic viscosity of the polymer does not increase significantly.

Further, when using ratios lower than 0.7, there is an increase of the temperature difference through the reactor section.

U.S. Pat. No. 4,161,578, describes a solid state crystallization/polycondensation process where the polymer in chips is crystallized in equipment with forced movement, at temperatures between 180° and 235° C. to obtain a crystallinity degree corresponding to at least 1.385 g/cm³ of density. The polymer is and subsequently fed to a polycondensation moving bed reactor, where the polymer is heated to temperatures higher than those used in the crystallization step.

Nitrogen is circulated in the polycondensation reactor, countercurrent to the polymer feed, with a ratio by weight of the rates of flow from 0.7 to 3.5 kg $N_2$/kg PET.

SUMMARY OF THE INVENTION

It has been unexpectedly found that, even using ratios of R between the rate of flow per hour by weight of inert gas fed to the polycondensation reactor and the rate of flow per hour by weight of the polymer coming out of the reactor lower than those considered until now as limit values and below which interesting results could not be obtained, it is possible to effectively remove the by-products of the polycondensation reaction, thus obtaining high reaction kinetics.

It has furthermore been unexpectedly found that the exothermic heat of the reaction decreases using low R ratios.

This allows better control of the thermal profile in the SSP reactor and also improves the plant operability.

The usable R ratio of the present invention is lower than 0.6 and preferably between 0.2 and 0.5.

The use of such low ratios allows considerable energy savings in the gas blowing operation.

DETAILED DESCRIPTION OF THE PRESENTLY PREFERRED EMBODIMENTS

In the process of the present invention the polycondensation reaction is carried out at temperatures between about 190° and 230° C., preferably between 210° and 220° C.

The polymer subject to the SSP reaction has a crystallinity degree in general between 40 and 50% by weight and is fed as chips.

Preferably, the crystalline organization of the polymer is such that the pre-melting peak appearing in the DSC curve is shifted toward temperatures higher than those used in the reaction.

Results of this type are obtainable by operating, for example, according to the crystallization process described in the Applicant's co-pending U.S. application Ser. No. 08/561,490 filed Nov. 20, 1995 whose description is incorporated herein by reference.

In the process described in the application, the chips of the amorphous polymer are first submitted to a crystallization process carried out in a fluidized bed and then to crystallization processes in two mechanical mixers. The first mixer is working at a temperature between 10° and 30° C. higher than that of the fluidized bed, and the second mixer is at a temperature corresponding to that used in the next SSP reactor.

The inert gas stream coming out from the SSP reactor is submitted to purification processes for the removal of the organic products impurities therein present.

The process is described in W095/02446 application whose description is incorporated herein by reference.

The average residence times in the SSP reactor are such as to obtain an increase of the polymer intrinsic viscosity of at least 0.1 dl/g. They are in general between 5 and 20 hours.

The kinetics of the intrinsic viscosity increase can be considerably increased if the polymer is blended in the molten state, in a step prior to crystallization, with a polyfunctional compound containing two or more groups capable of reacting with condensation or addition reaction with the OH and COOH end groups of the polyester.

The pyromellitic anhydride, and in general the dianhydrides of tetracarboxylic aromatic or aliphatic acids are examples of such compounds.

These compounds are used in a quantity in general between 0.1 and 2% by weight on the polymer.

The pyromellitic anhydride is the preferred compound. The use of these compounds is described in the European patent 422 282 and in U.S. Pat. Nos. 5,243,020, 5,334,669 and 5,338,808 whose description is incorporated herein by reference.

The polyester resins used in the crystallization process of the invention comprise the polycondensation products of $C_2$-$C_{20}$ diols such as ethylene glycol butylene glycol, 1,4 cyclohexandimethyol with aromatic bicarboxylic acids, such as terephthalic acid, 2,6 naphthalene bicarboxylic acid or their reactive derivatives such as the lower alkyl esters such as for example, dimethyl terephthalate.

Polyethylene terephthalate is the preferred resin.

Besides the terephthalic units additionally units deriving from other bicarboxylic acids such as the isophthalic acid and the naphthalendicarboxylic acids can be present in a quantity of about 0.5–20% by weight.

The following examples are given to illustrate but not to limit the invention.

EXAMPLE 1

A polycondensation test in the solid state was carried out in a continuous reactor a moving bed and a rate of flow of solid of 50 kg/h.

The resin used was a co-polyethylene terephthalate containing a percentage by weight of isophthalic acid of 2.2%.

The starting intrinsic viscosity was 0.60 dl/g. The acetaldehyde content was 35 ppm.

A polymer with a final intrinsic viscosity of 0.80 dl/g was produced keeping constant the average temperature of the reactor and changing only the inert gas quantity fed (nitrogen) (therefore changing the R ratio).

The average residence time was 12 hours.

The nitrogen fed contained less than 10 ppm of organic compounds expressed as methane equivalent.

The results obtained are shown in Table 1.

EXAMPLE 2

Using the same reactor, the same polymer and the same inert gas, as in example 1, tests were carried out using different temperatures of inert gas. The results obtained are shown in Table 2.

COMPARATIVE EXAMPLE 1

The test of example 1 was repeated using an R ratio of 1, keeping constant the average chips temperature at 210.1° C. and the residence time at 12 h.

The intrinsic viscosity the obtained polymer was of 0.80 dl/g.

TABLE 1

| Test No. | 1 | 2 | 3 | 4 | 5 |
|---|---|---|---|---|---|
| Nitrogen quantity kg/h | 5 | 10 | 15 | 20 | 25 |
| R Nitrogen/chips | 0.1 | 0.2 | 0.3 | 0.4 | 0.5 |
| Average temperature °C. | 210.1 | 210.1 | 210.2 | 210.3 | 210.4 |
| Max. Temp. chips °C. | 210.5 | 210.5 | 210.7 | 210.8 | 211.0 |
| IV final | 0.800 | 0.800 | 0.801 | 0.799 | 0.802 |
| IV Max. | 0.803 | 0.803 | 0.805 | 0.803 | 0.806 |
| IV Min. | 0.797 | 0.796 | 0.798 | 0.795 | 0.799 |

TABLE 2

| Test No. | 1 | 2 | 3 | 4 |
|---|---|---|---|---|
| Nitrogen quantity kg/h | 10 | 10 | 10 | 10 |
| Gas temperature °C. | 200 | 220 | 180 | 160 |
| R Nitrogen/chips | 0.2 | 0.2 | 0.2 | 0.2 |
| Mid. Temp. of chips °C. | 210.1 | 210.3 | 210.1 | 210.0 |
| Max. Temp. of chips °C. | 210.5 | 210.6 | 210.5 | 210.4 |
| IV end | 0.800 | 0.801 | 0.799 | 0.799 |

What is claimed is:

1. Continuous process for solid state polycondensation of aromatic polyester resins, comprising the steps of: feeding the resin through the top of a moving bed reactor and discharging the resin from the bottom; and circulating an inert gas counter or equicurrent with the resin, wherein the reactor has a temperature between 180° C. and 220° C., with resin average residence times long enough to obtain an increase of polymer intrinsic viscosity of at least 0.1 dl/g, and wherein a ratio R by weight between the gas rate of flow per hour and the rate of flow per hour of the polymer discharged from the reactor is lower than 0.6.

2. Process according to claim 1, where the ratio R is (comprised) between 0.2 and 0.5.

3. Process according to claim 1, where the temperature in the reactor is between approximately 190° and 210° C.

4. Process according to claim 2, where the temperature in the reactor is between approximately 190° and 210° C.

5. Process according to claim 1, where the inert gas is nitrogen.

6. Process according to claim 2, where the inert gas is nitrogen.

7. Process according to claim 3, where the inert gas is nitrogen.

8. Process according to claim 5, where the nitrogen is circulating in equicurrent with the polymer.

9. Process according to claim 1, where the polyester resin is polyethylene terephthalate or co-polyethylene terephthalate containing from 1 to 20% of isophthalic acid units.

10. Process according to claim 2, where the polyester resin is polyethylene terephthalate or co-polyethylene terephthalate containing from 1 to 20% of isophthalic acid units.

11. Process according to claim 3, where the polyester resin is polyethylene terephthalate or co-polyethylene terephthalate containing from 1 to 20% of isophthalic acid units.

12. Process according to claim 5, where the polyester resin is polyethylene terephthalate or co-polyethylene terephthalate containing from 1 to 20% of isophthalic acid units.

13. Process according to claim 8, where the polyester resin is polyethylene terephthalate or co-polyethylene terephthalate containing from 1 to 20% of isophthalic acid units.

14. Process according to claim 1, further comprising the steps of submitting the gas to a purification process to remove organic impurities and then recycling the gas to the reactor.

15. Process according to claim 2 further comprising the steps of submitting the gas to a purification process to remove organic impurities and then recycling the gas to the reactor.

16. Process according to claim 3 further comprising the steps of submitting the gas to a purification process to remove organic impurities and then recycling the gas to the reactor.

17. Process according to claim 5 further comprising the steps of submitting the gas to a purification process to remove organic impurities and then recycling the gas to the reactor.

18. Process according to claim 8 further comprising the steps of submitting the gas to a purification process to remove organic impurities and then recycling the gas to the reactor.

19. Process according to claim 9 further comprising the steps of submitting the gas to a purification process to remove organic impurities and then recycling the gas to the reactor.

* * * * *

UNITED STATES PATENT AND TRADEMARK OFFICE
CERTIFICATE OF CORRECTION

PATENT NO. : 5,708,124
DATED : January 13, 1998
INVENTOR(S) : Hussain Ali Kashif AL GHATTA and Dario GIORDANO It is certified that error appears in the above-identified patent and that said Letters Patent is hereby corrected as shown below:

Col. 1, ln. 22, change "2300°C" to --230°C.--
Col. 2, ln. 37, change "2350°C" to --235°C.--
Col. 2, ln. 38, change "2300°C" to --230°C.--

Signed and Sealed this

Thirtieth Day of June, 1998

Attest:

BRUCE LEHMAN

Attesting Officer

Commissioner of Patents and Trademarks